United States Patent [19]
Cook

[11] Patent Number: 5,967,172
[45] Date of Patent: Oct. 19, 1999

[54] ELECTRIC VACUUM REGULATOR VALVE

[75] Inventor: John E. Cook, Chatham, Canada

[73] Assignee: Siemens Canada Limited, Mississauga, Canada

[21] Appl. No.: 09/066,131

[22] Filed: Apr. 24, 1998

Related U.S. Application Data

[60] Provisional application No. 60/058,152, Sep. 8, 1997.

[51] Int. Cl.⁶ .................................................. G05B 11/48
[52] U.S. Cl. .................. 137/82; 251/129.08; 251/129.16
[58] Field of Search .......................... 137/82; 251/129.08, 251/129.16

[56] References Cited

U.S. PATENT DOCUMENTS

| | | | |
|---|---|---|---|
| 2,372,853 | 4/1945 | Ray | 251/129.16 |
| 2,631,612 | 3/1953 | Buescher | 251/129.16 X |
| 4,534,375 | 8/1985 | Fox | 137/82 |
| 4,610,428 | 9/1986 | Fox | 251/129.16 |
| 4,850,384 | 7/1989 | Cook | 137/129.16 X |

*Primary Examiner*—Gerald A. Michalsky

[57] ABSTRACT

An electric vacuum regulator has an enclosure containing an interior space and a solenoid assembly. An inlet port communicates the interior space to source vacuum. Vacuum communicated to the interior space is vented through a filter to atmosphere. Regulated vacuum is provided through an outlet port. A valve mechanism operated by the solenoid assembly selectively vents vacuum from the inlet port to the vent port and thereby creates regulated vacuum at the outlet port. The valve mechanism includes a valve element and a seat element. The latter has a continuous annular seat surface which circumscribes a vent path from the interior space to atmosphere that is opened and closed by the valve element, and a further surface which is disposed radially outward of the seat surface and against which the valve element also seats when closing the vent path. A groove that separates the further surface from the seat surface is vented to the interior space by through-holes in the valve element.

23 Claims, 2 Drawing Sheets

ELECTRIC VACUUM REGULATOR VALVE

REFERENCE TO RELATED APPLICATION AND PRIORITY CLAIM

This application expressly claims the benefit of earlier filing date and right of priority from the following co-pending patent application: U.S. Provisional Application Ser. No. 60/058,152 (Attorney Docket 97P7707US) filed on Sep. 8, 1997 in the name of John E. Cook, entitled "Electric Vacuum Regulator Valve" of which provisional patent application is expressly incorporated in its entirety by reference.

FIELD OF THE INVENTION

This invention relates generally to valves, and in particular to an electric vacuum regulator (EVR) valve that controls the delivery of vacuum from a vacuum source to a utilization device. An exemplary usage of such a valve is in association with the control of certain automotive emission control devices, such as an exhaust gas recirculation (EGR) valve that controls the recirculation of exhaust gas from an internal combustion engine to dope fuel-air charges entering the engine combustion chambers.

BACKGROUND OF THE INVENTION

Exhaust gas recirculation is a method used in automotive vehicle internal combustion engines for exhaust emission control. One type of EGR valve is vacuum operated, being controlled by vacuum delivered from an EVR (electric vacuum regulator) valve. The latter valve is controlled by a signal from an engine ECU (electronic control unit) to provide the appropriate amount of vacuum to the EGR valve. The EVR valve comprises an inlet port communicated to a vacuum source, namely the engine manifold vacuum, and an outlet port communicated to a vacuum inlet port of the EGR valve. The EVR valve is energized by an electric signal, a pulse width modulated (PWM) signal for example, to regulate the vacuum applied to the EGR valve inlet port by causing the applied vacuum to correspond to the ECU signal; the EGR valve responds by providing a corresponding recirculation of engine exhaust gas.

A known EVR valve used in a gasoline engine application can provide a regulated vacuum output over a range extending to approximately 125 mm. Hg. The EVR valve that is disclosed in U.S. Pat. No. 4,850,384, the entirety of which is hereby incorporated herein by reference, is an example of such a valve.

When the range of vacuum output of a valve of that type is extended, for example in a diesel engine application where vacuum may extend to approximately 700 mm. Hg, the valve may experience certain undesired effects that could impair its performance and/or durability. It is believed that recalibrating the valve's magnetic air gap to a smaller dimension can extend the range, but may cause unacceptable drift as the valve is cycled. Reducing the diameter of the sealing surface of the valve disk can allow the air gap to be increased, but may cause increased wear on the valve disk and/or valve seat; it may also cause instability as the valve is cycled.

SUMMARY OF THE INVENTION

The present invention relates to an EVR valve that is believed to deliver higher regulated vacuum free of undesired effects like those just mentioned.

One general aspect of the invention relates to an electric vacuum regulator comprising: an enclosure comprising an interior space and a solenoid assembly; an inlet port through which the interior space is communicated to source vacuum, a vent port through which vacuum communicated to the interior space through the inlet port can be vented, and an outlet port through which regulated vacuum can be supplied from the interior space; a valve mechanism operated by the solenoid assembly to selectively vent vacuum from the inlet port to the vent port and thereby create regulated vacuum at the outlet port; the valve mechanism comprising a valve and a seat that are relatively selectively positionable by the solenoid assembly, the seat comprising a continuous annular seat surface which circumscribes a vent path from the interior space to the vent port and with respect to which the valve selectively seats and unseats under control of the solenoid assembly to correspondingly close and open the vent path, thereby selectively venting the interior space to supply regulated vacuum through the outlet port; and the seat comprising a further surface which is disposed without the continuous annular surface and against which the valve also seats when seating on the continuous annular seat surface.

Further, more specific aspects of the invention include: the further surface comprising a further continuous annular surface spaced radially outward of the continuous annular seat surface; the continuous annular seat surface and the further continuous annular surface being circular and concentric, and disposed in a plane that is perpendicular to an imaginary longitudinal axis of the enclosure; the continuous annular seat surface having a substantially uniform radial dimension, the further continuous annular surface having a substantially uniform radial dimension, and the substantially uniform radial dimension of the continuous annular seat surface being less than the substantially uniform radial dimension of the further annular surface; the further continuous annular surface being spaced radially outward of the continuous annular seat surface by a continuous annular groove, and further including a groove vent for venting the groove to the interior space; the groove vent comprising at least one-through-opening in the valve; the valve comprising a disk having a flat axial end face providing respective annular zones for seating on and unseating from the continuous annular seat surface and the further annular surface respectively; the disk comprising a ferromagnetic material disposed in magnetic circuit relation with the solenoid assembly; a non-ferromagnetic layer disposed on the disk for seating against the continuous annular seat surface and the further annular surface; and the continuous annular surface and the further annular surface being provided on respective ridges of the seat.

Another general aspect of the invention relates to an electric vacuum regulator comprising: an enclosure having an imaginary longitudinal axis; a solenoid assembly disposed within the enclosure; an inlet port through which source vacuum can be communicated to an interior space of the enclosure; a vent port through which vacuum communicated to the interior space can be vented; an outlet port through which regulated vacuum can be supplied from the interior space; a valve mechanism operated by the solenoid assembly to selectively vent vacuum from the inlet port to the vent port and thereby create regulated vacuum at the outlet port; the valve mechanism comprising a seat element and a valve element that is operated by the solenoid assembly; the seat element comprising a continuous annular seat surface which circumscribes the axis, including circumscribing a flow path that extends between the interior space and the vent port and with respect to which the valve element selectively seats and unseats under control of the solenoid assembly to correspondingly close and open the flow path, thereby selectively venting the passage and supplying regulated vacuum through the outlet port; and the seat element comprising a further surface which is disposed in radially spaced apart relation to the continuous annular surface and against which the valve element also seats when seating on the continuous annular seat surface.

Still another general aspect of the invention relates to an electric-operated regulator comprising an enclosure having an imaginary longitudinal axis, a solenoid assembly disposed within the enclosure, a first port through which a first gas pressure can be communicated to an interior space of the enclosure, a second port through which a second gas pressure can be communicated to the interior space, a third port through which regulated gas pressure can be supplied from the interior space, a valve mechanism operated by the solenoid assembly to selectively bleed gas from one of the first and second ports to the other of the first and second ports and thereby create regulated gas pressure at the third port, the valve mechanism comprising a seat element and a valve element that is operated by the solenoid assembly, the seat element comprising a continuous annular seat surface which circumscribes the axis, including circumscribing a flow path that extends between the interior space and the second port and with respect to which the valve element selectively seats and unseats under control of the solenoid assembly to correspondingly close and open the flow path, and the seat element comprising a further surface which is disposed in radially spaced apart relation to the continuous annular surface and against which the valve element also seats when seating on the continuous annular seat surface.

Still another general aspect of the invention relates to a method of extending the range of regulated vacuum that can be delivered by an electric vacuum regulator of the type comprising an enclosure having an imaginary longitudinal axis, a solenoid assembly disposed within the enclosure, an inlet port through which source vacuum can be communicated to an interior space of the enclosure, a vent port through which vacuum communicated to the interior space can be vented, an outlet port through which regulated vacuum can be supplied from the interior space, a valve mechanism operated by the solenoid assembly to selectively vent vacuum from the inlet port to the vent port and thereby create regulated vacuum at the outlet port, the valve mechanism comprising a seat element and a valve element that is operated by the solenoid assembly, the seat element comprising a continuous annular seat surface which circumscribes the axis, including circumscribing a flow path that extends between the interior space and the vent port and with respect to which the valve element selectively seats and unseats under control of the solenoid assembly to correspondingly close and open the flow path, thereby selectively venting the passage and supplying regulated vacuum through the outlet port, the method comprising providing the seat element with a further surface which is disposed in radially spaced apart relation to the continuous annular surface and against which the valve element also seats when seating on the continuous annular seat surface.

The foregoing, and other features, along with various advantages and benefits of the invention, will be seen in the ensuing description and claims which are accompanied by drawings. The drawings, which are incorporated herein and constitute part of this specification, disclose a preferred embodiment of the invention according to the best mode contemplated at this time for carrying out the invention.

DESCRIPTION OF THE PREFERRED EMBODIMENT

Figure 1:
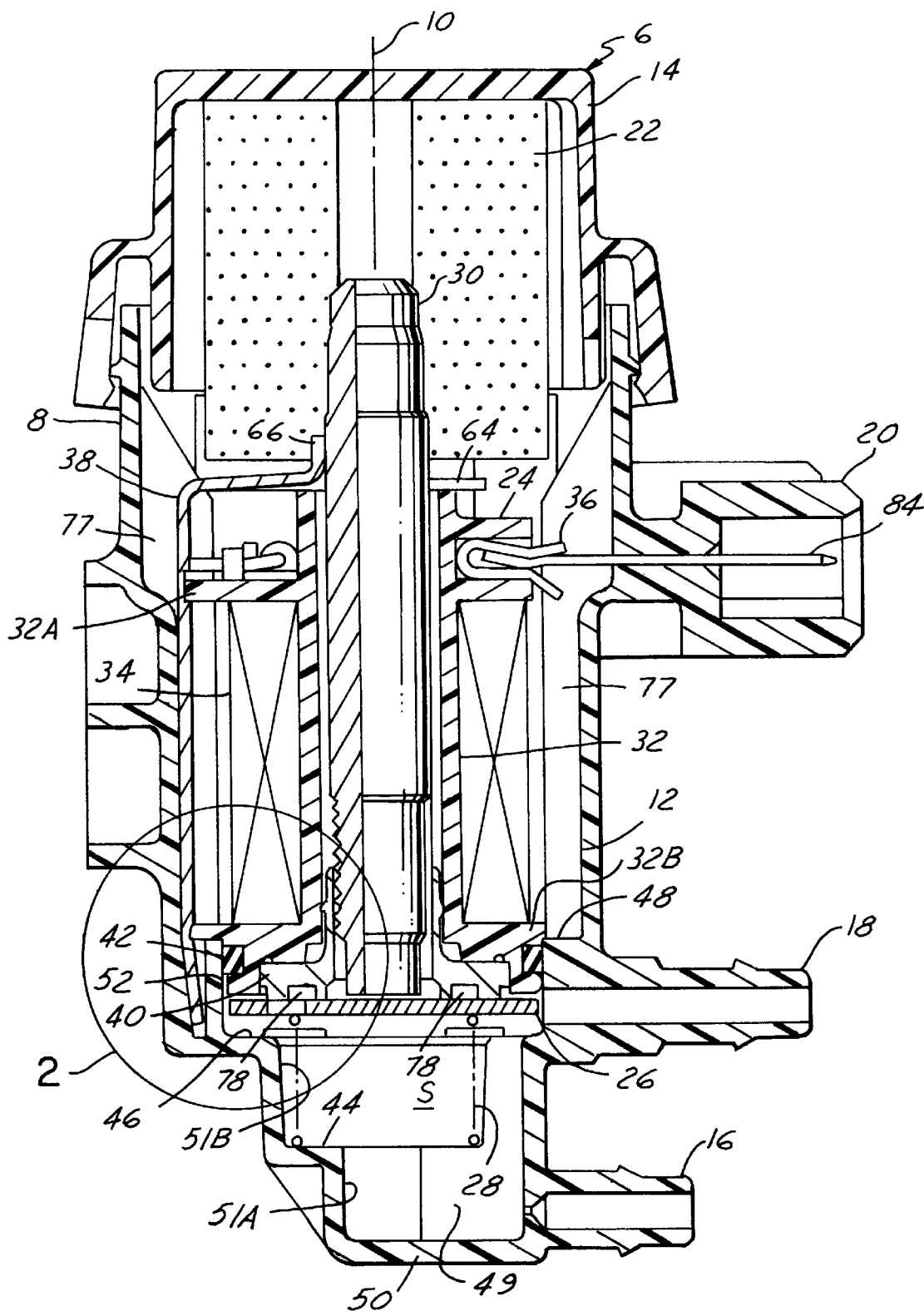
FIG. 1 is a longitudinal cross section view through an EVR valve embodying principles of the invention.
Figure 2:
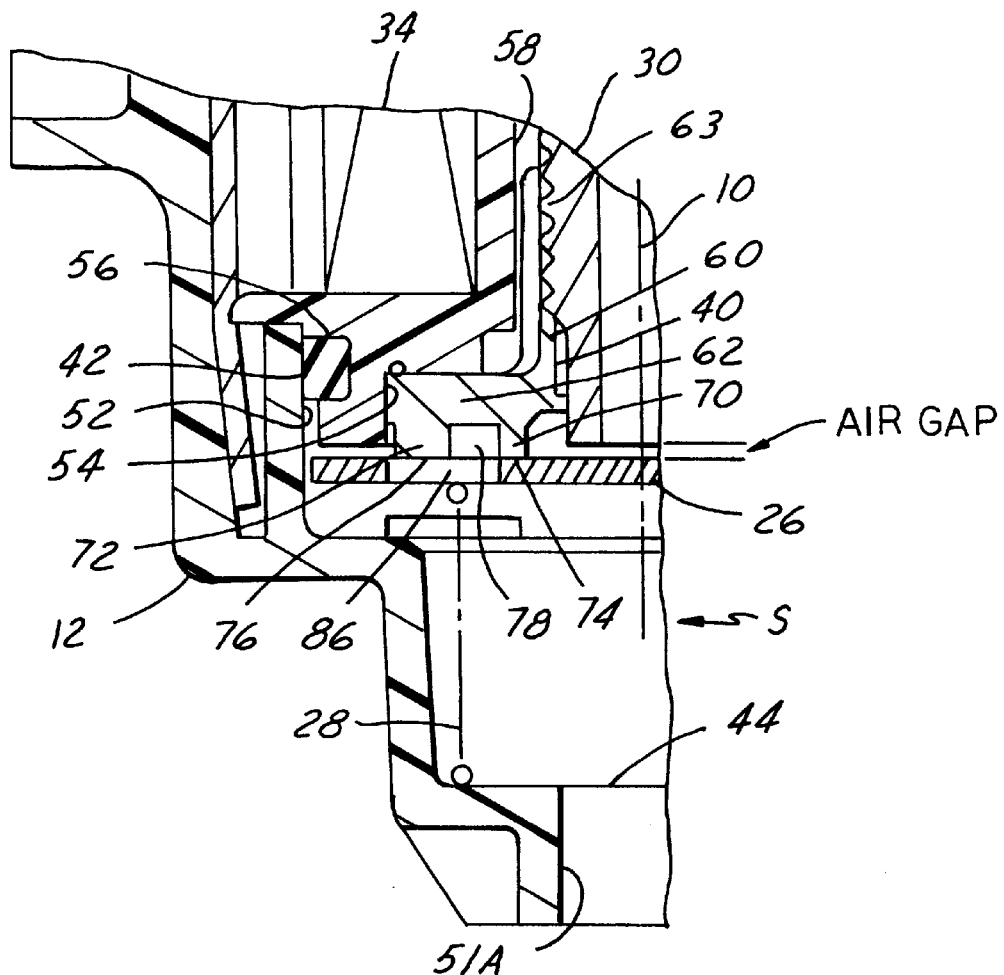
FIG. 2 is an enlarged view in circle 2 of FIG. 1.

FIGS. 1 and 2 show an EVR valve 6 comprising a generally cylindrical enclosure 8 having an imaginary longitudinal axis 10. EVR valve 6 is sometimes referred to simply as an electric vacuum regulator, or EVR. Enclosure 8 comprises a main body 12 whose open upper axial end is closed by a snap-on cap 14. Proximate its lower axial end, body 12 comprises a vacuum inlet port 16 in the form of a nipple projecting radially of body 12 and a vacuum outlet port 18 also in the form of a radially projecting nipple. Port 16 is adapted to be communicated to engine intake manifold vacuum via a conduit (not shown) having an end fitted onto its nipple. Port 18 is adapted to be communicated to an inlet port of a utilization device, such as a vacuumactuated EGR valve, also via a conduit (not shown) having an end fitted onto its nipple. Proximate its upper axial end, body 12 further comprises a radially projecting electric connector 20 that is adapted to be connected to a mating connector (not shown) leading to an engine ECU (not shown).

Several parts are assembled into the interior of enclosure 8. They include a particulate filter element 22, a solenoid assembly 24, a valve disk 26, and a spring 28. Solenoid assembly 24 comprises a tubular stator core 30 coaxial with axis 10, a bobbin 32 coaxially disposed on stator core 30, an electromagnet coil 34 disposed on bobbin 32, two electric terminals 36 arranged side-by-side, and facing radially, proximate the upper end of bobbin 32, a ferromagnetic return strap 38, a non-ferromagnetic seat element 40, and an O-ring 42.

Bobbin 32 is a non-ferromagnetic part, molded plastic for example. Coil 34 is created by winding magnet wire on bobbin 32 between upper and lower bobbin flanges 32A, 32B at axial ends of the bobbin. The upper bobbin flange is shaped to comprise receptacles for radially inner ends of terminals 36 and to provide for respective terminations of the wire forming coil 34 to be electrically joined to respective terminals 36. The outside diameter of the lower bobbin flange comprises a groove for receiving O-ring 42.

The lower end of body 12 comprises several axially spaced apart internal shoulders 44, 46, 48. Shoulder 44 is spaced from a transverse wall 50 that closes the lowermost axial end of body 12, and shoulders 46, 48 are spaced successively farther away. Between wall 50 and shoulder 44, port 16 opens to the interior of enclosure 8. Port 18 opens to the enclosure's interior between shoulders 46 and 48. Each shoulder 44, 46 would have a full circumferential extent except for being interrupted by a radial slot 49 in the sidewall of body 12 via which port 16 communicates with interior space that is otherwise circumscribed by internal surfaces 51A, 51B of that sidewall. Between port 18 and shoulder 48, O-ring 42 provides a radial seal between the periphery of bobbin flange 32b and an internal circular, axially extending, wall surface 52 of body 12. In this way the lower end of enclosure 8 comprises a sealed interior space S to which both ports 16 and 18 are communicated.

At its lower axial end face, bobbin flange 32B comprises two successive counterbores 54, 56 leading to a central circular bore 58 that continues to the opposite upper axial end face of flange 32A. Seat element 40 is an annular part that comprises an axial wall 60 and a radial wall 62. Radial wall 62 is dimensioned for fitting and retention within counterbore 54 in abutment with a shoulder that defines the upper boundary of that counterbore. Axial wall 60 extends from radial wall 62 a certain distance into the lower end of bore 58. The fit of seat element 40 to bobbin 32 is substantially fluid-tight.

The lower end of stator core 30 comprises a neck that protrudes from seat element 40 through radial wall 62. Immediately axially above that neck, the exterior wall surface of stator core 30 comprises a screw thread 63 that extends upward a certain distance to provide a threaded attachment with the inside diameter of axial wall 60. Beyond screw thread 63, stator core 30 extends completely through, and out of the upper end of, bore 58.

Upon exiting bore 58, stator core 30 is engaged by return strap 38.

The upper end of return strap 38 comprises a generally transverse rest 64 that lies against the free end of an upstanding tubular formation at the center of bobbin flange 32A and an axially projecting tab 66 that bears against the side of stator core 30. From its upper end, return strap 38 extends axially past flange 32A, coil 34, and flange 32B from whence it is chanted slightly inward to locate within a slot formed in body 12 axially and radially proximate the enclosure's interior space that is circumscribed by wall surface 52. This axial extent of return strap 38 has a limited width as measured circumferentially of axis 10.

Filter element 22 has a tubular shape. Its lower axial end is fitted onto the upper end of stator core 30. It is captured within enclosure 8 by cap 14, but the attachment of cap 14 to body 12 does not seal the interior of enclosure 8. Rather the upper end of the enclosure's interior is vented to atmosphere. This venting allows for air to pass through filter element 22 and stator core 30.

The lower axial end face of seat element 40 comprises a radially inner sealing ridge 70 and a radially outer bearing ridge 72. Both ridges 70, 72 are circular and concentric with axis 10, and each comprises a respective circular free edge surface 74, 76. Surfaces 74, 76 lie substantially in a common plane that is transverse to axis 10, specifically perpendicular to axis 10. Each has a uniform radial thickness, but that of surface 74 is smaller than that of surface 76. The two ridges 70, 72 are separated by an annular groove defining a free space 78 in seat element 40.

Disk 26 has a nominally circular shape having opposite axial end faces separated by a uniform axial thickness. The disk comprises ferromagnetic material; for example, it may be fabricated from AISI 400 Series stainless steel. Spring 28 comprises a resilient helical coil whose lower axial end seats on shoulder 44 and whose upper axial end bears against the lower axial end face of disk 26.

FIGS. 1 and 2 show a position assumed by internal parts when valve 6 is in a non-electrically energized condition. Spring 28 is acting on disk 26 to force the upper axial end face of disk 26 against seat element 40. One annular zone of that upper axial end face is in contact with edge surface 74 and another annular zone is in contact with edge surface 76. These abutted surfaces of disk 26 and seat element 40 are finished such that disk 26 seals against seat element 40, thereby blocking flow of air from the open lower end of stator core 30 to interior space S. Ports 16 and 18 freely communicate with interior space S regardless of the position of disk 26.

The various internal parts of EVR valve 6 can be assembled into body 12 via its open upper end before cap 14 is attached. Body 12 comprises several circumferentially spaced apart, axially extending ribs 77 on the interior of its sidewall for circumferentially locating solenoid assembly 24 therein. Solenoid assembly 24 is axially located by abutment of a peripheral lip of bobbin flange 32B with shoulder 48. After assembly of solenoid assembly 24 into body 12, electric terminals 84 can be passed through the wall of body 12 within connector 20, and preferably sealed thereto, to establish connection with terminals 36. A suitable electric signal that is applied to terminals 84 can then be effective to operate solenoid assembly 24.

A magnetic circuit is cooperatively formed by disk 26 and solenoid assembly 24. A portion of disk 26 is disposed in the air gap that exists between the lower end of stator core 30 and the lower end of return strap 38, thereby reducing that air gap to a smaller first gap between the return strap and the disk, and a smaller second gap between the disk and stator core. Disk 26 is also radially confined by the closely circumscribing wall surface 52.

Disk 26 comprises one or more through-holes 86 extending axially through its outer margin radially outward of sealing ridge 70 for venting space 78 to interior space S when disk 26 is in the seated position of FIGS. 1 and 2 blocking flow through the lower axial end of stator core 30. The axial heights of ridges 70, 72 place surfaces 74, 76 in a common plane axially below the axial end of lower bobbin flange 32B. Hence, the entire surface area of disk 26 is exposed to interior space S, except for locations where the upper axial end face of the disk is in contact with seat element 40, such as the annular zone that is abutting surface 74, a circular zone circumscribed by that annular zone, and any locations that are abutting surface 76.

The electromagnetic force vs. electric current characteristic of the disclosed magnetic circuit that comprises solenoid assembly 24 and disk 26, the force vs. compression characteristic of spring 28, the mass and dimensions of disk 26, and the dimensions of ridges 70, 72 are chosen in relation to the range of vacuum that may be applied to port 16 such that the vacuum at port 18 is regulated by the electric signal applied to terminals 84 to within a range extending from and below 100% of the vacuum applied at port 16. An effective control strategy comprises applying a PWM signal at a suitable frequency, such as 125 Hz for example. The application of increasing vacuum to port 16 will tend to increasingly unseat disk 26 from 15 seat element 40, increasingly compressing spring 28 in the process. By passing electric current through coil 34, solenoid assembly 24 creates an opposing force in the direction of seating disk 26 on seat element 40. For a given vacuum at port 16, modulation of the electric current flow in coil 34 will modulate the position of disk 26 relative to seat element 40, allowing air to flow through lower stator core 30 to port 16, thereby venting through filter 22 to atmosphere, some of the vacuum applied to inlet port 16. Hence the flow path through stator core 30 and filter 22 to atmosphere may be considered to comprise a vent port to atmosphere from interior space S. Because of this air flow producing vacuum venting, less than 100% of the vacuum at port 16 is communicated to port 18. In this way, the modulation of the electric signal applied to EVR valve 6 is effective to regulate the vacuum at port 18 to a desired magnitude.

By providing two ridges 70, 72 in seat element 40, the radial thickness of the radially inner ridge 70 may be made relatively smaller than if the seat element had only a single ridge. This provides more precise definition of the effective seal diameter that is defined by inner sealing ridge 70. Although the provision of two ridges creates the annular groove that defines space 78, the inclusion of holes 86 essentially eliminates that groove from having undesired effects on valve operation. Impacting of disk 26 with seat element 40 is shared by both ridges. By making the area of surface 76 of ridge 72 relatively larger area than that of surface 74 of ridge 70, the former shares a greater proportion of the impact and thereby attenuates impacting of the disk at its effective seal diameter. As a result, stabilization of disk operation can be achieved, and unacceptable wear avoided.

One of port 16 and the atmospheric vent through filter element 22 may be considered a first port through which a first gas pressure can be communicated to interior space S, and the other may be considered a second port through which a second gas pressure can be communicated to interior space S. Port 18 may be considered a third port through which regulated gas pressure can be supplied from interior space S. Solenoid assembly 24 operates the valve mechanism comprising valve element 40 and valve disk 26 to selectively bleed gas from one of the first and second ports to the other of the first and second ports and thereby create regulated gas pressure at the third port FIG. 2 graphically defines the valve "air gap" as the axial distance between the lower axial end of stator core 30 and the confronting surface of disk 26 when the disk is seated against seat element 40. Testing has shown that for a given maximum vacuum at port 16, the inventive principles allow for this air gap to be significantly increased in comparison to that which would be allowable in a valve like that disclosed in U.S. Pat. No. 4,850,384. Increased air gap can provide significantly less drift in the regulated vacuum output over the useful life of the valve. For example, the air gap may be increased from 0.1 mm to 0.4 mm. Hence, an aspect of the invention relates to a method of extending the range of regulated vacuum that can be delivered by an electric vacuum regulator of the type that has been described herein, the method comprising providing surface 76 in radially spaced apart relation to the continuous annular surface 74 so that disk impact will be distributed over both surfaces as the disk seals against surface 74.

Figure 3:
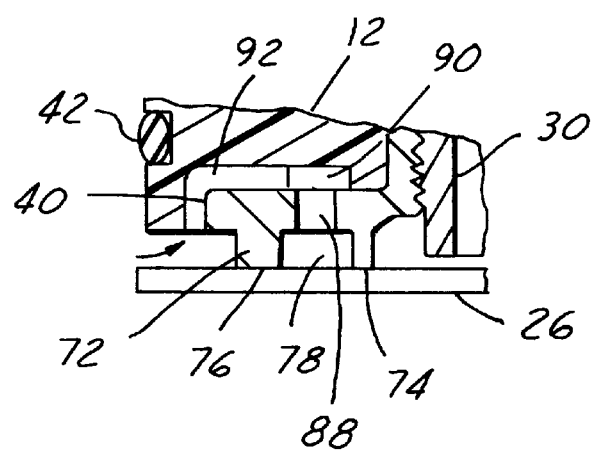
FIG. 3 is a view similar to FIG. 2 showing another embodiment.

FIG. 3 discloses another embodiment that differs from that of FIGS. 1 and 2 in how space 78 is communicated to interior space S when disk 26 is seated on seat element 40. Radial wall 62 comprises one or more axial through-holes 88 that communicate space 78 to an annular groove 90 provided in the lower end face of bobbin flange 32B. One or more channels 92 formed in bobbin flange 32B communicate groove 90 to the interior space circumscribed by wall surface 52.

While a presently preferred embodiment of the invention has been illustrated and described, it should be appreciated that principles are applicable to other embodiments that fall within the scope of the following claims. For example, it is contemplated that disk 26 may have a bi-laminar construction like the disk described in U.S. Pat. No. 4,850,384. Such a construction comprises an upper sealing layer, which may be a non-metallic material, joined in face-to-face relation with a lower ferromagnetic layer.

What is claimed is:

1. An electric vacuum regulator comprising:
    an enclosure comprising an interior space and a solenoid assembly;
    an inlet port through which the interior space is communicated to source vacuum, a vent port through which vacuum communicated to the interior space through the inlet port can be vented, and an outlet port through which regulated vacuum can be supplied from the interior space;
    a valve mechanism operated by the solenoid assembly to selectively vent vacuum from the inlet port to the vent port and thereby create regulated vacuum at the outlet port;
    the valve mechanism comprising a valve and a seat that are relatively selectively positionable by the solenoid assembly, the seat comprising a continuous annular seat surface which circumscribes a vent path from the interior space to the vent port and with respect to which the valve selectively seats and unseats under control of the solenoid assembly to correspondingly close and open the vent path, thereby selectively venting the interior space to supply regulated vacuum through the outlet port; and
    the seat comprising a further surface which is disposed without the continuous annular seat surface and against which the valve also seats when seating on the continuous annular seat surface.

2. An electric vacuum regulator as set forth in claim 1 in which the further surface comprises a further continuous annular surface spaced radially outward of the continuous annular seat surface.

3. An electric vacuum regulator as set forth in claim 2 in which the continuous annular seat surface and the further continuous annular surface are circular and concentric.

4. An electric vacuum regulator as set forth in claim 3 in which the enclosure has an imaginary longitudinal axis, and the continuous annular seat surface and the further continuous annular surface are disposed in a plane that is perpendicular to the axis.

5. An electric vacuum regulator as set forth in claim 4 in which the continuous annular seat surface has a substantially uniform radial dimension, the further continuous annular surface has a substantially uniform radial dimension, and the substantially uniform radial dimension of the continuous annular seat surface is less than the substantially uniform radial dimension of the further continuous annular surface.

6. An electric vacuum regulator as set forth in claim 2 in which the further continuous annular surface is spaced radially outward of the continuous annular seat surface by a continuous annular groove, and further including a groove vent for venting the groove to the passage.

7. An electric vacuum regulator as set forth in claim 6 in which the groove vent comprises at least one-through-opening in the valve.

8. An electric vacuum regulator as set forth in claim 7 in which the valve comprises a disk having a flat axial end face providing respective annular zones for seating on and unseating from the continuous annular seat surface and the further continuous annular surface respectively.

9. An electric vacuum regulator as set forth in claim 7 in which the valve comprises a ferromagnetic disk.

10. An electric vacuum regulator as set forth in claim 9 further including a non-ferromagnetic layer disposed on an axial end face of the ferromagnetic disk and providing respective surface zones for respective seating on the continuous annular seat surface and the further continuous annular surface.

11. An electric vacuum regulator as set forth in claim 1 in which the continuous annular seat surface and the further surface are disposed on respective ridges of the seat.

12. An electric vacuum regulator as set forth in claim 11 in which the further surface comprises a further continuous annular surface.

13. An electric vacuum regulator as set forth in claim 12 in which continuous annular seat surface and the further continuous annular surface are circular and concentric and are disposed in a plane that is perpendicular to an imaginary longitudinal axis of the enclosure.

14. An electric vacuum regulator as set forth in claim 13 in which the continuous annular seat surface has a substantially uniform radial dimension, the further continuous annular surface has a substantially uniform radial dimension, and the substantially uniform radial dimension of the continuous annular seat surface is less than the substantially uniform radial dimension of the further continuous annular surface.

15. An electric vacuum regulator comprising:

an enclosure having an imaginary longitudinal axis;

a solenoid assembly disposed within the enclosure;

an inlet port through which source vacuum can be communicated to an interior space of the enclosure;

a vent port through which vacuum communicated to the interior space can be vented;

an outlet port through which regulated vacuum can be supplied from the interior space;

a valve mechanism operated by the solenoid assembly to selectively vent vacuum from the inlet port to the vent port and thereby create regulated vacuum at the outlet port;

the valve mechanism comprising a seat element and a valve element that is operated by the solenoid assembly;

the seat element comprising a continuous annular seat surface which circumscribes the axis, including circumscribing a flow path that extends between the interior space and the vent port and with respect to which the valve element selectively seats and unseats under control of the solenoid assembly to correspondingly close and open the flow path, thereby selectively venting the passage and supplying regulated vacuum through the outlet port; and the seat element comprising a further surface which is disposed in radially spaced apart relation to the continuous annular surface and against which the valve element also seats when seating on the continuous annular seat surface.

16. An electric vacuum regulator as set forth in claim 15 in which the further surface comprises a further continuous annular surface spaced radially outward of the continuous annular seat surface by an intervening annular groove in the seat element, the continuous annular seat surface has a substantially uniform radial dimension, the further continuous annular surface has a substantially uniform radial dimension, and the substantially uniform radial dimension of the continuous annular seat surface is less than the substantially uniform radial dimension of the further continuous annular surface.

17. An electric vacuum regulator as set forth in claim 16 in which the continuous annular seat surface and the further continuous annular surface are circular and concentric, and the continuous annular seat surface and the further continuous annular surface are disposed in a plane that is perpendicular to the axis.

18. An electric vacuum regulator as set forth in claim 16 further including a groove vent for venting the groove to the interior space.

19. An electric vacuum regulator as set forth in claim 18 in which the groove vent comprises at least one-through-opening in the valve element.

20. An electric vacuum regulator as set forth in claim 18 in which the groove vent is provided in the seat element.

21. A method of extending the range of regulated vacuum that can be delivered by an electric vacuum regulator of the type comprising an enclosure having an imaginary longitudinal axis, a solenoid assembly disposed within the enclosure, an inlet port through which source vacuum can be communicated to an interior space of the enclosure, a vent port through which vacuum communicated to the interior space can be vented, an outlet port through which regulated vacuum can be supplied from the interior space, a valve mechanism operated by the solenoid assembly to selectively vent vacuum from the inlet port to the vent port and thereby create regulated vacuum at the outlet port, the valve mechanism comprising a seat element and a valve element that is operated by the solenoid assembly, the seat element comprising a continuous annular seat surface which circumscribes the axis, including circumscribing a flow path that extends between the interior space and the vent port and with respect to which the valve element selectively seats and unseats under control of the solenoid assembly to correspondingly close and open the flow path, thereby selectively venting the passage and supplying regulated vacuum through the outlet port, the method comprising:

providing the seat element with a further surface which is disposed in radially spaced apart relation to the continuous annular surface and against which the valve element also seats when seating on the continuous annular seat surface.

22. A method as set forth in claim 21 in which the further surface is provided as a further continuous annular surface spaced radially outward of the continuous annular seat surface by an intervening annular groove in the seat element, and including providing the continuous annular seat surface with a substantially uniform radial dimension, providing the further continuous annular surface with a substantially uniform radial dimension, and making the substantially uniform radial dimension of the continuous annular seat surface smaller than the substantially uniform radial dimension of the further continuous annular surface.

23. A method as set forth in claim 22 further including providing a groove vent for venting the groove to the interior space.

* * * * *